Patented Mar. 24, 1942

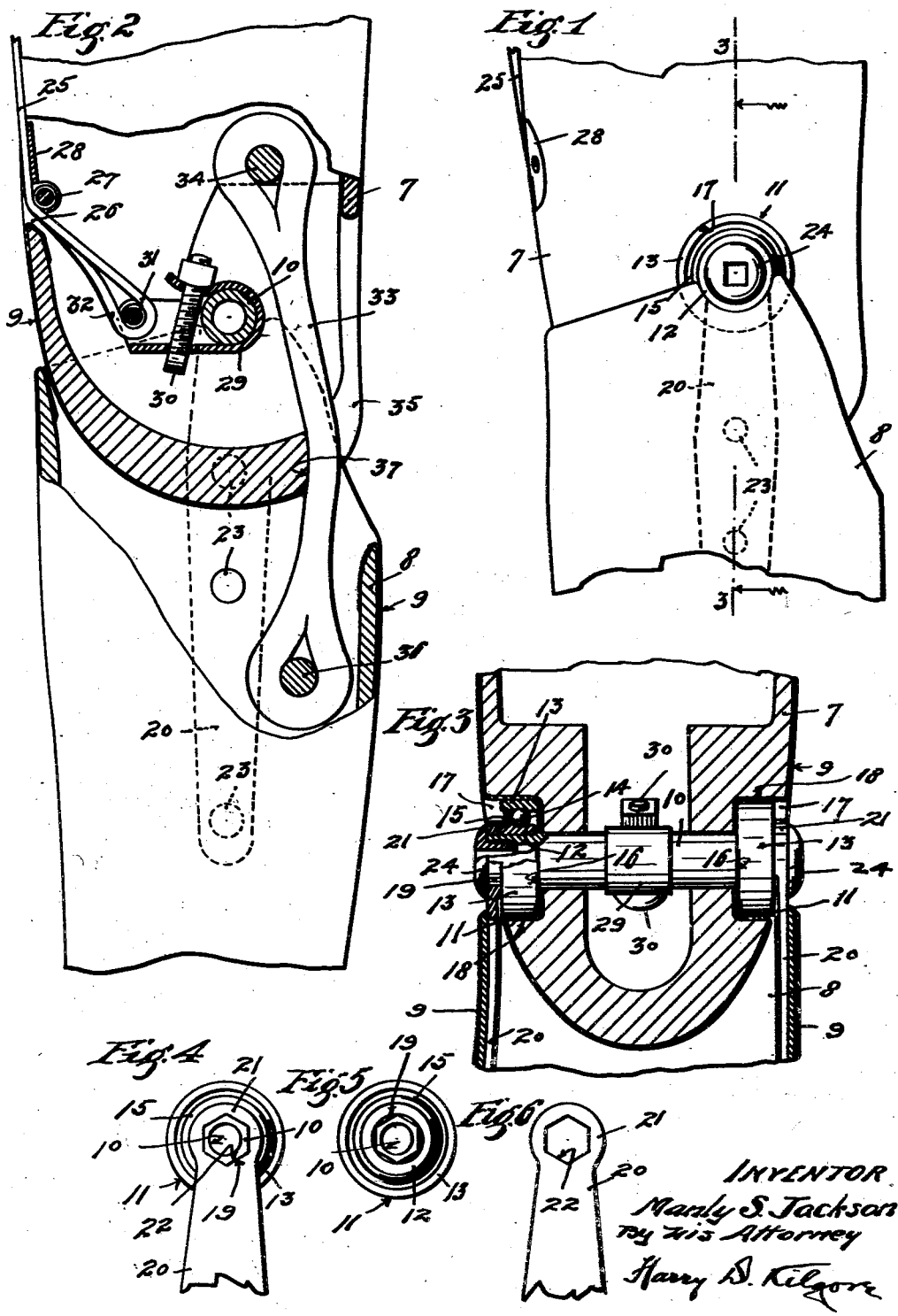

2,277,548

UNITED STATES PATENT OFFICE 2,277,548

KNEE JOINT FOR ARTIFICIAL LEGS

Manly S. Jackson, Minneapolis, Minn., assignor to The Winkley Artificial Limb Co., Minneapolis, Minn., a corporation of Minnesota Application January 8, 1940, Serial No. 312,938

2 Claims. (Cl. 3—2)

My invention relates to improvements in artificial limbs and more particularly to an improved knee joint for artificial legs.

The object of this invention is to provide an improved knee joint that is extremely simple, relatively light in weight, easy to assemble and install, and free and easy in its action.

A further object of the invention is to mount the axle of the improved knee joint in ball bearings that are packed in a lubricating grease and sealed at the time of installation so that no further lubrication of the ball bearings is necessary throughout the life of the knee joint.

The invention further provides a novel process of mounting the straps of a lower leg section upon the end portion of an axle carried by the upper leg section.

Other objects of the invention will be apparent from the following description had in connection with the drawing.

To the above end, generally stated, the invention consists of the novel devices, combinations of devices and arrangement of parts hereinafter described and defined in the claims.

In the accompanying drawing, which illustrates the invention, like characters indicate like parts throughout the several views.

Referring to the drawing:

Fig. 1 is a fragmentary side elevation of an artificial leg having the invention embodied therein;

Fig. 2 is a fragmentary view partly in side elevation and partly in central vertical section;

Fig. 3 is a fragmentary view partly in rear elevation and partly in vertical section taken substantially on the line 3—3 of Fig. 1;

Fig. 4 is a face view of one of the ball bearings and attached upper portion of the metal strap with the screw removed;

Fig. 5 is a face view of the ball bearing shown in Fig. 4; and

Fig. 6 is a face view of the metal strap shown in Fig. 4.

The numerals 7 and 8 indicate, respectively, the lower or knee portion of the upper section of an artificial leg and the upper portion of the lower section of said leg. It may be assumed that the leg sections 7 and 8, as shown, are hollow, made of wood and covered with raw-hide or any other suitable material 9.

The improved knee joint includes a hollow axle 10, the end portions of which are mounted in a pair of ball bearings 11. Each ball bearing 11 comprises inner and outer races 12 and 13, respectively, and interposed balls 14 held in a cage or by any well-known means, not shown. A thin ring-like metal member 15 is interposed between the races 12 and 13, outwardly of the balls 14, with grease tight joints therebetween. As shown, the member 15 is mounted in annular grooves in the ball races 12 and 13 and the ball races 13 are free to turn relative to said member.

The outer end portions of the axle 10 are reduced in diameter to form a pair of axially spaced shoulders 16 on said axle. The inner ball races 12 are telescoped onto the reduced outer end portions of the axle 10 and frictionally held from turning movement therewith and engage the shoulders 16 as stops, which limit the axial movement of the ball bearings 11 onto the axle 10.

By reference to Fig. 3, it will be noted that the ball bearings 11 are mounted in a pair of diametrically opposite round recesses 17 in the sides of the upper leg section 7. The periphery of the outer ball races 13 are round and snugly fit the recesses 17. Before the ball bearings 11 are inserted into the recesses 17, said recesses are lined with raw-hide or any other suitable material 18 that has been soaked in water to make the same soft and pliable. While the lining 18 is still wet, the ball bearings 11 are pressed into the recess 17 with a very tight fit. When the linings 18 dry they frictionally hold the outer ball races 13 in the recess 17, prevent the same from turning therein, and seal the joints between the upper leg section 7 and the ball bearings 11. When pressing the ball bearings 11 into the recesses 17, the inner ends of the outer ball races 13 are forced against the linings 18, on the inner ends of said recesses, and seal the backs of the ball bearings 11. Before the ball bearings 11 are placed in the recesses 17 they are packed with a lubricating grease and as the ball bearings 11 are sealed at both their inner and outer faces, the grease cannot escape therefrom, and the ball bearings 11 will be permanently greased and need no further attention.

The end portions of the axle 10, which project outwardly of the ball bearings 11, are hexagon in cross-section, as indicated at 19. The axle 10 is connected at each end to the lower leg section 8 by an upright metal strap 20. Each metal strap 20 is entirely embedded in upright channels in the respective side of the lower leg section 8, except its upper end portion, which extends outwardly of the upper edge portion of said leg section and terminates in a head 21 having a transverse hexagon passageway 22. Rivets 23 rigidly secure the straps 20 to the lower leg section 8. The hexagon ends 19 of the axle 10 extend axially through the hexagon passageways 22 in the straps 20 with a snug fit and thereby lock the axle 10 to the straps 20 for turning movement in the ball bearings 11 to oscillate the straps 20 and thereby swing the lower leg section 8 relative to the upper leg section 7.

Obviously, the ball bearings 11 permit the upper leg section 7 to freely swing about the axis of the axle 10 and relative to the lower leg section 8.

The heads 21 on the straps 20 are held against outward movement on the axle 10 by screws 24 which extend axially into the hollow axle 10 and have threaded engagement therewith. These screws 24 have large relatively flat heads which overlap the strap heads 21 and hold the same tightly pressed against the outer ends of the inner ball races 12, which, in turn, press the inner ends of said races against the shoulders 16, see Fig. 3. The screws 24 are of the hollow head type.

The mounting of the straps 20 on the axle 10 affords a novel process which consists, first, in distorting, by pressure, the upper portion of the lower leg section 8 to increase the transverse width of said leg section and thereby spread the two strap heads 21 apart sufficiently to permit the strap heads 21 to be moved endwise over the ends of the axle 10. Next, in moving one of the leg sections endwise in respect to the other leg section to align the hexagon passageways 22 with the hexagon ends 19 of the axle 10. Next, in releasing the pressure on the lower leg section 8 and allowing the same to spring back into normal position and thereby move the strap heads 21 toward each other and onto the hexagon ends 19 of the axle 10. Finally, in applying the screws 24 to the axle 10 to hold the heads 21 thereon.

The forwardly swinging movement of the lower leg section 8 is imparted thereto by a control strap 25 attached to the body of the wearer of the artificial leg by suspenders, not shown, in the customary or any suitable manner. This control strap 25, which extends upwardly and outwardly of the upper leg section 7, at the front thereof, enters said leg section through an aperture 26 therein, just above the axle 10, and passes under an anti-friction directional roller 27 journalled in a bracket 28 secured to said leg section. The inner end of the control strap 25 is attached to the axle 10 by a crank arm 29. This crank arm 29 is frictionally clamped onto the axle 10 by a nut-equipped bolt 30. An anti-friction roller 31 is journaled on the crank arm 29 at the free end thereof and the control strap 25 is secured thereto by means of a loop 32 formed in said strap.

A flexible stop 33, in the form of a relatively heavy cable, is provided for limiting the forwardly swinging movement of the lower leg section 8. This stop 33 is anchored at one end to the upper leg section 7, as indicated at 34, extends through a vertical slot 35 in said leg section, and is anchored at its other end to the lower leg section 8, as indicated at 36. Said stop 33, at its intermediate portion, engages the upper leg section 7 at the lower end of the slot 35 as an abutment 37.

While the invention is shown embodied in an artificial leg made of wood covered with a suitable material, it is, of course, understood that the same is equally well adapted for embodiment in any type of artificial leg.

From the above description it is evident that the improved knee joint, while extremely simple and consisting of few parts that require no further attention after once being installed, is highly efficient for the purpose had in view.

What I claim is:

1. The combination with the upper and lower sections of an artificial leg, said upper leg section having in its sides a pair of diametrically opposite recesses, of a ball bearing mounted in each recess and comprising inner and outer ball races and balls interposed therebetween, each recess being lined with rawhide or the like, the outer ball races being pressed into the recess with the inner ends thereof forced against the lining to frictionally hold said outer ball races from turning in the recesses and to seal the ball bearings at their inner faces, an axle having axially spaced stop shoulders, the inner ball races being mounted on the end portions of the axle with their inner end engaging said shoulders, and frictionally held from turning on the axle, the peripheries of the end portions of the axle outwardly of the ball bearings being out of round, a pair of upright straps on the sides of the lower leg section and having heads on their upper ends, said heads having transverse apertures into which the end portions of the axle project, the figuration of the apertures being substantially the same as that of the peripheries of the end portions of the axle, whereby the straps are locked on the axle for common movement therewith, and headed screws in the ends of the axle for holding the heads of the straps on the axle.

2. The combination with the upper and the lower sections of an artificial leg, the upper leg section having in its sides a pair of diametrically opposite recesses, and a covering of rawhide applied to the upper leg section and extending into said recesses and completely lining the same, of a knee joint connecting the two leg sections and including a ball bearing mounted in each recess and comprising inner and outer ball races and balls interposed therebetween, said outer ball races being pressed into the recesses and pinching the covering, whereby said outer ball races are frictionally held from turning in the recesses, said lining for the recesses affording seals for the inner ends of the ball bearings.

MANLY S. JACKSON.